United States Patent [19]

McCornack

[11] 3,842,857

[45] Oct. 22, 1974

[54] METERING VALVE CONSTRUCTION

[76] Inventor: Robert R. McCornack, 980 N. Broad St., Galesburg, Ill. 61401

[22] Filed: Apr. 6, 1973

[21] Appl. No.: 348,515

[52] U.S. Cl.................. 137/242, 251/33, 251/39
[51] Int. Cl......................................... F16k 31/143
[58] Field of Search ........... 251/39, 43, 33; 137/242

[56] References Cited
UNITED STATES PATENTS

| | | | |
|---|---|---|---|
| 2,613,688 | 10/1952 | Knaggs................................ | 251/39 |
| 3,048,194 | 8/1962 | Huthsing, Sr. et al............ | 251/39 X |
| 3,400,731 | 9/1968 | McCornack..................... | 251/39 X |
| 3,729,167 | 4/1973 | Gulich................................ | 251/39 |

Primary Examiner—Arnold Rosenthal
Attorney, Agent, or Firm—McDougall, Hersh & Scott

[57] ABSTRACT

A toilet flush valve construction consisting of an outer sleeve portion and a piston assembly normally closing one end of said sleeve. Operable means are adapted for pressurized displacement of the piston assembly within the sleeve to allow entry of fluids or gases into said sleeve for continued passage to the outlet. The sleeve defines internal walls providing bearing support for the piston assembly. A metering orifice passage is associated with the piston assembly for controlling the cycling of the valve.

13 Claims, 7 Drawing Figures

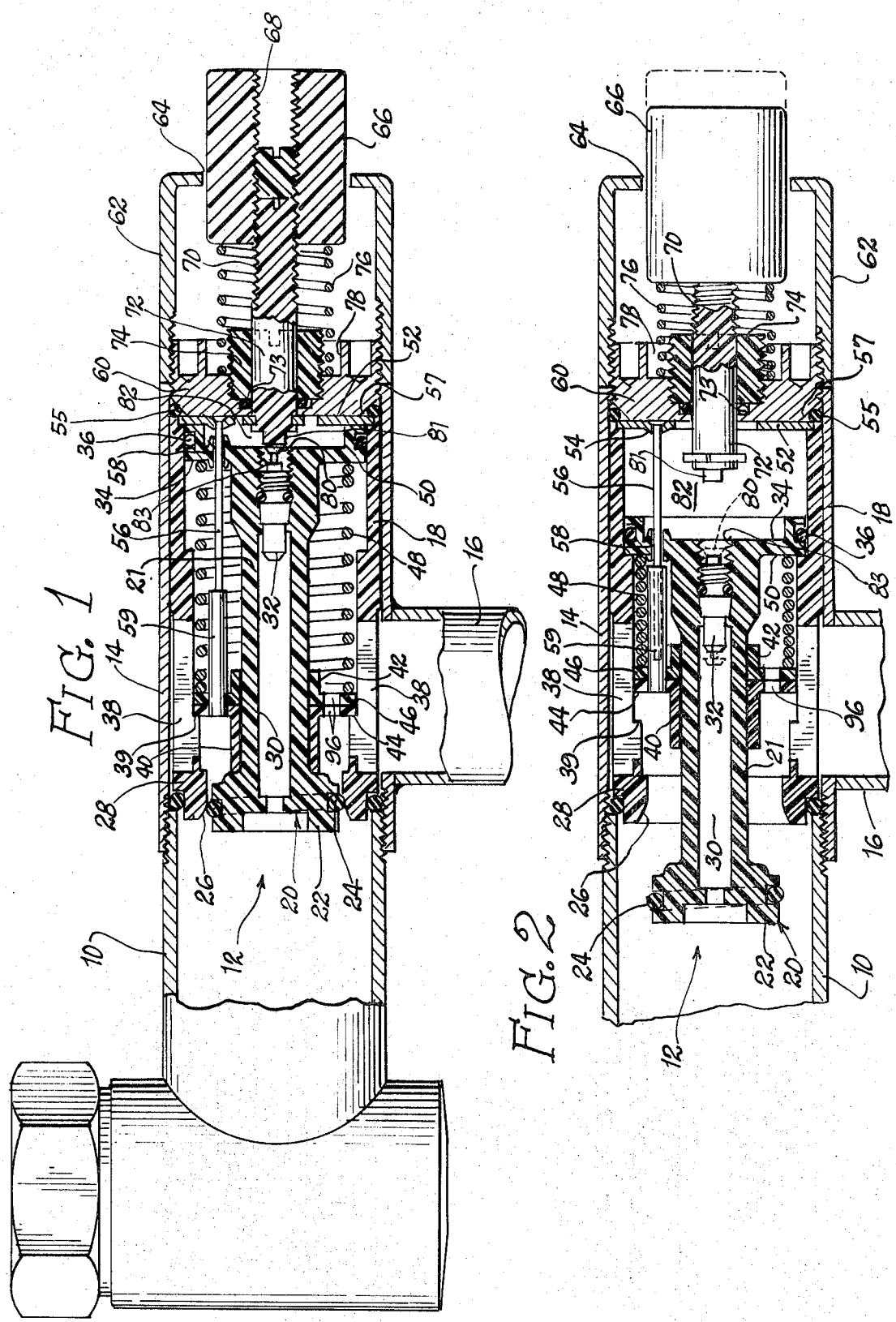

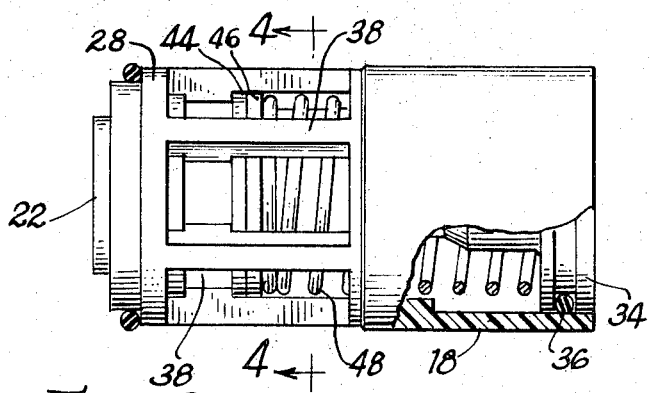
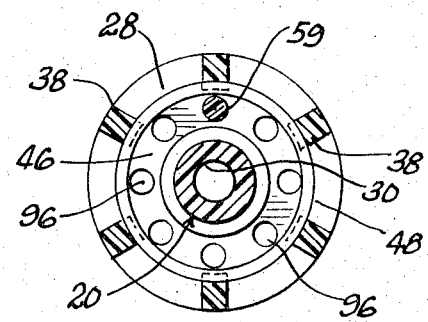
Fig. 3   Fig. 4
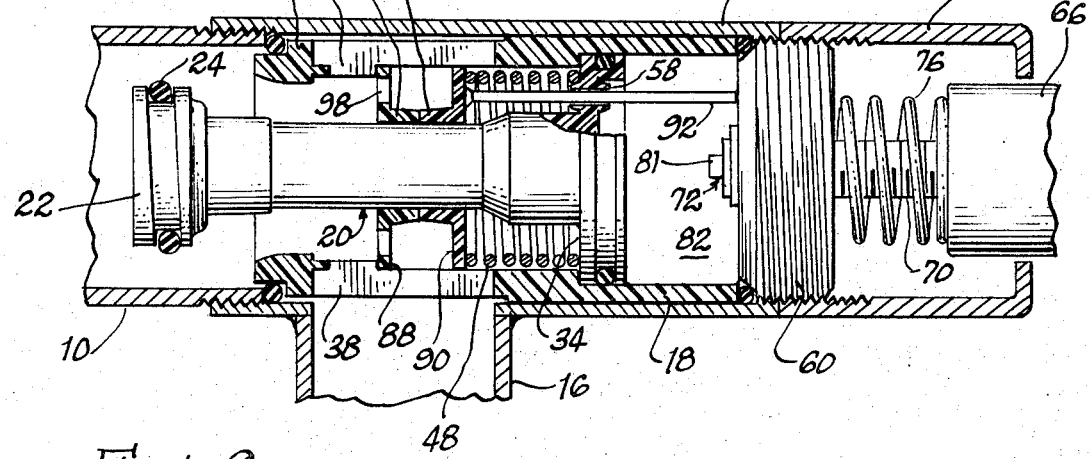
Fig. 5
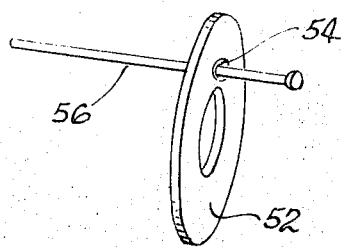
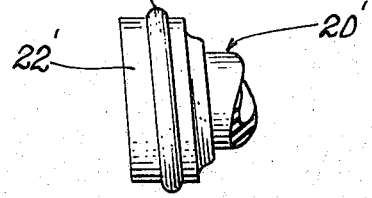
Fig. 6   Fig. 7

3,842,857

METERING VALVE CONSTRUCTION

This invention relates to a valve employed for metering fluids, including liquids or gases in predetermined quantities. Valves of this type are commonly used for flushing toilets, urinals and other applications.

Valves of the general type contemplated by this invention are disclosed in applicant's U.S. Pat. No. 3,400,731, issued on Sept. 10, 1968, and entitled "Fluid Valve With self-cleaning Metering Orifice." The design emphasizes the use of a pin arrangement which is associated with a metering passage for controlling the time interval the valve is in the open position, thereby controlling the amount of material passing through the construction. The pin design includes a bent end which, when acted upon by fluid movement through the valve causes rotation of the pin thereby cleaning the metering passage to prevent blocking thereof.

It is a general object of this invention to provide improved valve designs which are characterized by a highly reliable mode of operation.

It is a more specific object of this invention to provide valve designs which include movable parts having positive reciprocating bearing supports with a high degree of reliability in operation.

It is a further object of this invention to provide a valve design which includes unique means for providing self-cleaning metering passages whereby the reseating action of the cycle of valve operation can be precisely controlled and uniformly maintained.

These and other objects of this invention will appear hereinafter, and for purposes of illustration, but not of limitation, specific embodiments of the invention are shown in the accompanying drawings in which:

FIG. 1 is a side elevation, partly cut away, of a valve construction characterized by the features of this invention;

FIG. 2 is a fragmentary cross-sectional view illustrating the construction in the open position;

FIG. 3 is a side elevational view partly cut away illustrating the outer sleeve construction and associated piston assembly;

FIG. 4 is a cross-sectional view taken about the line 4—4 of FIG. 3;

FIG. 5 is a side elevational view in section illustrating one alternative form of the invention;

FIG. 6 is a perspective view illustrating a metering passage pin and associated retaining means utilized in one form of the invention; and, FIG. 7 is a fragmentary side elevational view illustrating an alternative piston design.

The construction of this invention generally comprises a valve adapted to be associated with an open passage. The valve comprises an outer sleeve sealed in the passage and a piston assembly within the sleeve for normally closing one end of the passage. An actuating means is employed for displacing a piston to open access to the valve sleeve whereby fluid or gas can flow into the sleeve and progress through outlets provided in the side walls of the sleeve.

The valve sleeve has an interior wall which supports slideable bearing means for stabilizing the piston assembly. Means are provided for reciprocating the piston assembly after it has been displaced for passage of fluid or gas.

Cycling means include a pressure chamber which is located at one end of the valve sleeve and which communicates with a small valve structure associated with the piston assembly. When activated, this small valve structure permits entry of fluid or gas into the pressure chamber thereby displacing the piston assembly to permit passage through the valve sleeve. When the desired directional movement of the piston assembly has been achieved, it is reciprocally urged, by reverse directional pressure and spring means, toward its original seated position. The interval of return movement is controlled by means of a metering passage communicating with the aforementioned pressure chamber and permitting a predetermined discharge flow of fluid or gas from the chamber whereby the interval during which the valve is unseated is controlled.

The metering orifice consists of a cylindrical passage encircling a pin means therein, the passage being slightly larger in diameter than the diameter of the pin means. This invention includes unique means for mounting and holding the pin means to provide a reciprocating cleaning action for the orifice.

FIGS. 1 and 2 illustrate the valve associated with tubes which are designed for carrying liquids or gas. The arrangement comprises a tubular section 10 which is connected to a suitable water supply or to any other source of fluid. The valve structure 12 of this invention is located in the tubular section 14. The section 14 has a T-shaped configuration including an angularly extending section 16 comprising an outlet which can be connected to an inlet associated with flushing a toilet.

The valve construction 12 consists of an outer sleeve section 18 and a reciprocally movable piston assembly 20. The piston assembly 20 defines an enlarged end 22 which carries a sealing ring 24. This end is adapted to seat on the cylindrical surface 26 defined by the annular end 28 of the sleeve 18.

The piston assembly also defines a central conduit passage 30 which communicates the tube section 10 with a valve 32 fixed in position opposite end 22. This end of the piston assembly also defines an enlarged end portion 34 carrying sealing ring 36.

The sleeve 18 consists of an intermediate portion defining a cage construction which includes a plurality of spaced-apart webs 38. Pairs of cylindrical members 40 and 42 are spaced inwardly of sleeve 18. These members define flanges 44 and 46, the flanges serving to slideably dispose the cylindrical members within the webs 38. The cylindrical members 40 and 42 define central passages which slideably encircle the outer diameter of the conduit 21 thereby providing bearing support for the piston assembly.

The flange 46 of the cylindrical member 42 provides a seat for one end of spring 48 which is disposed encircling conduit 21 within the sleeve 18. The opposite end of the spring 48 bears against the surface 50 defined by the enlarged piston end 34. Since the flange member 44 abuts offset 39 of sleeve 18, the spring 48 in compression serves to normally hold the piston assembly 20 in the seated position shown in FIG. 1.

In the construction shown in FIGS. 1 and 2, a washer 52 is supported at one end of the sleeve 18 and, as shown in FIG. 1, the enlarged piston end 34 is positioned against this washer when the piston assembly is in the seated position. The washer defines a dimpled portion 54 (FIG. 6) which defines a central opening for receiving a pin 56. The opposite end of this pin is aligned with the post 59 which extends perpendicularly from the flange member 46. A cavity is provided in post 59 for receiving pin 56, this cavity extending to a depth necessary for accommodating relative movement of the pin as will be explained.

An O ring 55 is received in an annular space chamfer 57 which is defined by collar 60. This O ring bridges the end of sleeve 18 and the interior wall of section 14 to accomplish an impermeable seal.

As shown in FIGS. 1 and 2, the pin 56 is received in passage 58 defined by the enlarged piston end 34. The passage 58 is of slightly larger diameter than the pin 56 whereby an orifice for flow is defined around the pin.

The collar 60 is threadably engaged with the section 14, and this collar serves as a means for affixing an end cap 62. The end cap defines an end opening 64 which receives an actuating push button 66. This push button defines an internally threaded valve adjustment area 68 which receives the threaded end 70 of rod 72. The rod 72 is slideably received within a bearing sleeve 74 carried by the collar 60 and sealingly communicated to said collar 60 by O ring 73. A spring 76 has one end positioned in the annular groove 78 defined by the collar 60 with the other end bearing against push button 66. This normally holds the push button in the position shown in FIG. 1.

In the operation of the construction shown in FIGS. 1 and 2, the push button 66 is depressed to activate associated rod 72. This rod is provided with a projection 81 adapted to enter passage 83 carrying valve 32. This action serves to unseat the valve stem 80 of the valve 32 whereby communication is provided to the pressure chamber 82 which is defined between the collar 60 and the enlarged piston end 34. When this communication is established, water or gas will flow through the conduit passage 30, through the valve 32 and into the chamber 82.

The flow into the chamber 82 under pressure bears against the relatively large surface area defined by the piston end 34. A differential force relationship between this end of the piston assembly and the smaller end 22 is thus developed. Shifting movement of the piston assembly 20 will then occur unseating the piston end 22 allowing flow through the open end of the sleeve 18, through the cage portion of the sleeve, and into the outlet section 16. The action of this flow is also directed against the upstream face of flange 44 forcing it away from abutment 39 to allow for more unobstructed flow to the outlet and to also increase the compression of spring 48.

Unseating of the piston assembly 20 will be maintained as long as the valve stem 80 is held in the open position by the rod 72. When the rod 72 is released the valve stem 80 will return to the normally closed position whereby the predominate force on the piston end 34 will be nullified. At this point, the spring 48 combined with a predominate upstream force will move the piston assembly 20 toward the seated position. This return movement interval is controlled by the rate of fluid flow through the orifice defined by the passage 58 and the pin 56 together with the progressively reducing compressed strength of spring 48.

Since the orifice is restricted, the seating movement of the piston assembly 20 will occur with delaying action, thereby allowing for the passage of adequate water or gas to flow through the valve during cycling. This delaying action can be controlled by varying the size of the orifice or adjusting the length of the movement of rod 72.

As the valve reciprocally closes, the rate of travel diminishes in proportion to the reduction in compression of spring 48. This results in a relatively slow flow during the concluding interval of the valve cycle. This important feature provides the slower flow required to refill trap seals on such devices as toilets and urinals as compared to the fast flow required for flushing.

When the valve 12 is operated in the manner described, the enlarged end 34 of the piston assembly 20 is reciprocated relative to pin 56. This accomplishes cleaning of the orifice during each cycle of the valve.

The O ring 24 carried by the enlarged end 22 is positioned in a groove which is disposed at an oblique angle relative to the plane of piston assembly 20 and cylindrical surface 26. It has been found that by disposing the O ring in a position such as that shown, water hammer and vibration problems characteristic of sleeve valves can be eliminated. The O ring will seat relative to the end of the sleeve 18 on a progressive basis rather than have all portions of the ring engage the seat 26 simultaneously.

FIG. 5 illustrates certain alternatives which are available with the construction of this invention. In this design, the bearing support for the piston assembly 20 is provided by means of cylindrical elements 84 and 86. These elements include outwardly directed flange portions 88 and 90 with the latter providing an abutting surface for a pin 92. The pin 92 is received in passage 58 with the ends of the pin in abutment with flange 90 and collar 60. Reciprocal movement of the passage 58 relative to the pin 92 is accomplished to provide the desired cleaning action.

The use of multiple cylindrical members such as members 40 and 42 shown in FIGS. 1 and 2, and the members 84 and 86 shown in FIG. 5, provides substantial bearing support for the piston assembly 20. In order to provide this support without encountering any significant restriction in flow, openings 96 are defined by the flange portions 44 and 46 of said members so that free flow through these openings in addition to the flow between portions of the webs 38 upstream of these cylindrical members is accomplished. Similar openings 98 are provided in the flange portion 88 of the cylindrical member 84.

As an alternative to the use of multiple cylindrical members for providing bearing support for the piston assembly 20, a single cylindrical member could be employed. Such a member could be utilized in combination with various other described features. Thus the single member could be used for supporting a post such as shown at 59 in FIGS. 1 and 2. With or without such a post, the use of the washer construction is contemplated. The pin support shown in FIG. 5 could also be provided with only a single cylindrical member being used as the bearing member.

FIG. 7 shows an alternative construction using an angular piston head 22'. This illustrates the obvious alternative to mounting an O ring at an angle to its plane of travel.

As illustrated above, the structures of this invention utilize various features which can be employed alone or in combination to provide an improved metering valve. It will be understood that various changes and combinations may be made in these structures while still operating within the spirit of the invention.

That which is claimed is:

1. In a metering valve for disposition in a tubular section between inlet and outlet portions of said section, said valve comprising a sleeve defining an open end and an open side wall, a piston assembly reciprocally movable in said sleeve and having a first piston head adapted to close said open end to prevent flow through said valve, and an actuating means for shifting said piston assembly to displace said first piston head and thereby open communication between inlet and outlet portions of said valve, said piston assembly defining an internal passage and a second piston head at the end of said passage, said second piston head forming a movable wall of a chamber into which fluid from said passage is adapted to flow, and a separate valve in said internal passage adapted to be opened by said actuating means whereby fluid enters said chamber to shift said second piston head, a metering orifice associated with said second piston head, resilient and pressure means for imparting return movement to said piston assembly whereby the fluid in said chamber is slowly discharged through said orifice to accomplish gradual return of said first piston head to seated position, the improvement comprising a bearing means situated within said sleeve slideably disposed within the side wall thereof, said bearing means defining a cylindrical opening with said piston assembly being received within said opening for reciprocal movement relative to the bearing means, said bearing means serving as a support for said piston assembly and for said resilient means thereby maintaining alignment of the piston assembly relative to said sleeve, a portion of the side wall of said sleeve consisting of spaced-apart web members to provide an outlet opening in the side wall, said bearing means comprising at least one element having a tubular section defining said cylindrical opening, and an externally formed flange portion extending outwardly from said tubular section, said flange portion being disposed within said sleeve.

2. A valve in accordance with claim 1, including a plurality of openings defined by said flange portion to facilitate fluid or gas flow into said outlet portion of said tubular section.

3. A valve in accordance with claim 1, wherein said second piston head defines a passage, a pin having an outer diameter slightly less than the diameter of said passage, said pin being received in and continually extending through said passage with the combination of the pin and passage defining said metering orifice, and a post extending perpendicularly from said flange in the direction of said second piston head, said post being aligned with the passage in the piston head and said pin engaging said post for maintaining the pin in position for relative reciprocal movement of the second piston head, the reciprocating movement of the passage relative to the pin serving to keep the metering orifice free of obstructions.

4. A valve in accordance with claim 3 including a washer located at the end of said chamber opposite said second piston head, said washer defining an opening for receiving said pin whereby the combination of said washer and said post serves to hold said pin in position during reciprocation of said piston.

5. A valve in accordance with claim 4 wherein said pin defines an enlarged head, and a dimple defined by said washer in the area of the opening of the washer whereby said pin head is held flush with the surface of the washer.

6. A valve in accordance with claim 1 including a passage defined by said second piston head and a pin having a diameter less than the diameter of said passage located within and extending beyond the limits of said passage, the combination of said passage and said pin providing said metering orifice, and a washer situated in said chamber opposite said piston head, said washer defining an opening for receiving said pin to thereby position the pin during shifting of the piston, the reciprocating movement of said passage relative to said pin cooperating to maintain the metering orifice free of obstructions.

7. A valve in accordance with claim 1 wherein said second piston head defines a passage, a pin having a diameter less than the diameter of said passage located within said passage, the combination of said pin and said passage providing said metering orifice, an abutment defined by said flange for receiving said pin, said pin being thereby maintained in position during shifting of said piston, the relative movement of said orifice and said pin during shifting of the piston operating to maintain the metering orifice free of obstructions.

8. A valve in accordance with claim 7 wherein said bearing means consist of a pair of elements having tubular sections and flange portions, the flange portion opposite the flange abutting said pin defining a plurality of openings to facilitate movement of fluid or gas into said outlet portion of said sleeve.

9. A valve in accordance with claim 1 wherein said first piston head carries a sealing ring, the sealing ring on said first piston head being disposed at an angle slightly offset from a plane extending perpendicularly to the axis of said piston whereby the sealing ring engages said open end of said sleeve in sequential fashion during opening and closing of said open end.

10. In a metering valve for disposition in a tubular section between inlet and outlet portions of said section, said valve comprising a sleeve defining an open end and an open side wall, a piston assembly reciprocally movable in said sleeve and having a first piston head adapted to close said open end to prevent flow through said valve, and an actuating means for shifting said piston assembly to displace said first piston head and thereby open communication between inlet and outlet portions of said valve, said piston assembly defining an internal passage and a second piston head at the end of said passage, said second piston head forming a movable wall of a chamber into which fluid from said passage is adapted to flow, and a separate valve in said internal passage adapted to be opened by said actuating means whereby fluid enters said chamber to shift said second piston head, a metering orifice associated with said second piston head, resilient and pressure means for imparting return movement to said piston assembly whereby the fluid in said chamber is slowly discharged through said orifice to accomplish gradual return of said first piston head to seated position, the improvement comprising a bearing means situated within said sleeve slideably disposed within the side wall thereof, said bearing means defining a cylindrical opening with said piston assembly being received within said opening for reciprocal movement relative to the bearing means, said bearing means serving as a support for said piston assembly and for said resilient means thereby maintaining alignment of the piston assembly relative to said sleeve, wherein said first piston head carries a sealing ring, the sealing ring on said first piston head being disposed at an angle slightly offset from a plane extending perpendicularly to the axis of said piston whereby the sealing ring engages said open end of said sleeve in sequential fashion during opening and closing of said open end.

11. In a metering valve for disposition in a tubular section between inlet and outlet portions of said section, said valve comprising a sleeve defining an open end and an open side wall, a piston assembly reciprocally movable in said sleeve and having a first piston head adapted to close said open end to prevent flow through said valve, and an actuating means for shifting said piston assembly to displace said first piston head and thereby open communication between inlet and outlet portions of said valve, said piston assembly defining an internal passage and a second piston head at the end of said passage, said second piston head forming a movable wall of a chamber into which fluid from said passage is adapted to flow, and a separate valve in said internal passage adapted to be opened by said actuating means whereby fluid enters said chamber to shift said second piston head, a metering orifice associated with said second piston head, resilient and pressure means for imparting return movement to said piston assembly whereby the fluid in said chamber is slowly discharged through said orifice to accomplish gradual return of said first piston head to seated position, the improvement wherein said orifice is provided by means of a passage defined by said second piston head, a pin encircled by said passage, said pin continuously extending through said passage and being loosely received in the passage and being reciprocal relative to said passage during operation of the valve to thereby maintain the orifice free of obstructions, means positioned at the end of said chamber opposite said second piston head for securing the pin in position during reciprocation of the second piston head relative thereto.

12. A valve in accordance with claim 11 including means for holding the opposite end of said pin in position, said last mentioned means including a cavity receiving said opposite end of said pin.

13. A valve in accordance with claim 12 wherein said last mentioned means comprises a post, a bearing means positioned in surrounding relationship relative to said piston assembly, said post being mounted on said bearing means, and wherein said cavity is sufficiently deep to permit relative movement of said post and said pin.

* * * * *